United States Patent Office 3,538,161
Patented Nov. 3, 1970

3,538,161
REDUCTIVE ALKYLATION OF AROMATIC AMINO COMPOUNDS UTILIZING PLATINUM METAL SELENIDES AND TELLURIDES AS CATALYSTS
Frederick S. Dovell, Naugatuck, Conn., assignor to Uniroyal, Inc., New York, N.Y., a corporation of New Jersey
No Drawing. Filed Oct. 20, 1967, Ser. No. 676,691
Int. Cl. C07c 85/08, 85/12
U.S. Cl. 260—576                                    4 Claims

ABSTRACT OF THE DISCLOSURE

Organic compounds having a nitro group are hydrogenated, those having nitro groups and amino groups are reductively alkylated, and organic disulfides are hydrogenolysized in the presence of catalytic amounts of a platinum metal selenide or a platinum metal telluride.

---

This invention relates to the use of selenides and tellurides of platinum metals as heterogeneous hydrogenation catalysts for the reduction of various organic compounds with molecular hydrogen. Specifically, the invention teaches the use of the aforesaid catalysts for specific hydrogenation reactions, such as, reductive hydrogenation, reductive alkylation and hydrogenolysis.

The catalysts of the invention are advantageous for several reasons. Firstly, side reactions such as the hydrogenation of aromatic rings; cleavage of bonds of carbon to hydrogen, carbon, nitrogen, sulfur, oxygen or halogen; and reduction of aldehydes or ketones to corresponding alcohols are substantially eliminated.

Secondly, these platinum metal selenides and tellurides are insensitive to poisons, even such as sulfur-containing compounds that severally inhibit most other catalysts. Thus, they may be used with sulfur-, selenium-, or tellurium-containing feeds and do not require purified hydrogen. Indeed, such platinum metal selenide and telluride catalysts may be used for the hydrogenation of compounds containing one or more sulfur, selenium, or tellurium atoms in the molecule. Their insensitivity to poisons insures a long life at a high level of activity even after long exposure to the common catalyst poisons. And finally, also because of their activity, they have the advantage of being effective at economically desirable relatively low pressures and temperatures.

The platinum metal selenide and telluride catalysts can be prepared by one or more of the commonly known methods, such as, by treatment of dilute acid solutions of the metal compounds with hydrogen selenide or hydrogen telluride or by reaction of the metal with hydrogen selenide or telluride, elemental selenium or tellurium or other selenium- or tellurium-containing compounds. The catalyst may be prepared in situ if desired. The catalyst may be prepared and used as a bulk powder or supported on a suitable carrier, such as carbon or alumina. Whether supported or not, it may be prepared as a powder and used for liquid phase slurry or for vapor fluidized reactions. Pellets for liquid or vapor phase fixed bed operations may also be employed.

The reductive alkylations which may be advantageously performed in accordance with the invention include the reaction of organic compounds containing a nitro or amino group of the general structure X—R—NO$_2$ or X—R—NH$_2$, where R can be alkyl, cycloalkyl or aryl and X can be any other group such as alkyl, vinyl, alkoxy, carboxyl ester, nitrile, halogen or hydroxyl that does not enter into reaction under the conditions described below, with aldehydes or ketones in the presence of molecular hydrogen. Where the nitro compound is employed as the starting material it is initially hydrogenated, in situ, to the amino compound which is subsequently reductively alkylated with the carbonyl compound.

Examples of the organic compounds which may be reductively alkylated are aniline, p-aminodiphenylamine, N-phenyl-p-phenylenediamine, o-, m-, or p-phenylenediamine, benzylamine, the toluidines, the xylidines, anisidines, α- or β-naphthylamine, the naphthylenediamines, haloamines as for example p-chloroaniline, alkylamines such as methyl-, isopropyl- or cyclohexylamines, ethylenediamine, furfurylamine, or the corresponding compound in which the nitrogen is present initially as a nitro group which is hydrogenated, in situ, to the amine. The aldehydes which are employed as alkylating agents generally contain from 2 to 12 carbon atoms, while the ketones generally contain from 3 to 15 carbon atoms. Aliphatic aldehydes and aliphatic and alkylaryl ketones are preferred.

Examples of aldehydes which may be employed include acetaldehyde, propionaldehyde, butyraldehyde, valeraldehyde, 2-methylpentaldehyde, 2-ethyl butyraldehyde, heptaldehyde, 2-ethylhexaldehyde, nonyladehyde, decaldehyde, furfural, glutaraldehyde, glyoxal, hydroxyadipaldehyde, sucrose, benzaldehyde, tolualdehyde and anisaldehyde.

Examples of ketones include acetone, methyl ethyl ketone, methyl propyl ketone, methyl isobutyl ketone, methyl isoamyl ketone, ethyl butyl ketone, diethyl ketone, 5-methylheptanone-3, diisobutyl ketone, isobutyl heptyl ketone, diheptyl ketone, cyclopentanone, cyclohexanone, cyclooctanone, 2,4-pentane dione, 2,5-hexanedione, acetophenone, acetonaphthone, benzophenone, valerophenone.

The reductive hydrogenations include the reduction of aliphatic and aromatic nitro compounds to their corresponding amino compounds, and the addition of hydrogen to unsaturated linkages. The nitro compounds are the same as those compounds set forth in the discussion relating to reductive alkylation. The unsaturated compounds which may be hydrogenated include conjugated olefins or conjugated diolefins, both straight, branched and cyclic types, having from 3 to 25 carbon atoms.

Typical unsaturated compounds of the conjugated diolefin type include 1,3-butadiene, isoprene, piperylene, carotene, cyclopentadiene, 1,3-cyclohexadiene, 1,3-cyclooctadiene, 2,3-dimethylbutadiene-1,3, in which cases a selective reduction to the mono-olefin will be effected.

Typical unsaturated compounds which contain an olefin conjugated with other groups include acrolein, acrylic acid, maleic acid or anhydride, methyl methacrylate, acrylonitrile, methacrylonitrile, styrene, divinyl benzene, stilbene. In compounds of the foregoing types, the olefinic linkage will be reduced while the other functionality will remain unaffected.

The hydrogenolysis or reductive cleavage reaction which may be performed with the catalysts of the invention include the conversion of disulfide compounds to mercaptans and the aryl-N-nitrosoamines to arylamines.

Examples of disulfides which may be reduced to the corresponding mercaptans are methyl, propyl, amyl, heptyl, lauryl or other saturated aliphatic disulfides, allyl and oleyl disulfides, cyclohexyl, cyclopentyl, and bornyl disulfides, ethylene, trimethylene, and tetramethylene disulfides.

Examples of aryl-N-nitrosoamines and their reduction products are N-nitrosodiphenylamine to diphenylamine, N-nitroso-p-nitrodiphenylamine to p-aminodiphenylamine, N-nitrosophenyl-α-(or β-)naphthylamine to phenyl-α- (or β-)naphthylamine.

The reaction may be run at temperatures ranging from about 50° C. to 300° C., preferably from 75 to 250° C., and at pressures ranging from about 3 to 1500 atmospheres or higher though such higher pressures are not necessary. Sufficient hydrogen must be present to appropriately reduce the reactants. For example where a nitro compound is reductively alkylated at least four moles of hydrogens are needed for each mole of the nitro compound plus the mole of the carbonyl compound. Generally, a large excess of hydrogen is used to maintain the desired operating pressure, the particular excess not being critical. The exact conditions will depend, of course, on the nature of the hydrogenation reaction being carried out, and the optimum economic combination of temperature, pressure, catalyst level and cycle time.

The reactions may be carried out in either batch or continuous systems, with either tank or pipe line type reactors and in the liquid phase with slurry or fixed bed catalyst, or in the vapor phase with either fluidized or fixed bed catalysts, operating in a manner well known to those skilled in the art.

Catalyst levels will of course be determined by the particular catalyst used, the type of reaction, temperature and pressure limitations, and whether fixed bed or slurry system. For a fixed bed system, one usually speaks of the liquid or weight hourly space velocity which is the volume or weight of reactants passing over a specified volume or weight of catalyst per hour. Ranges of WHSV of 0.01 to 50 or higher are commonly employed while ranges of 0.1 to 25 are preferred.

For slurry operations catalyst levels are determined as weight percent concentration of the total reactant mix or of one specific reactant. Concentrations usually range from about 0.01% to 50%, although a more practical range would be from 0.5 to 25%.

Examples of the preparation of the catalysts used in the invention follow:

EXAMPLE A

Twenty-five grams of aluminum powder and 44 grams of selenium powder were thoroughly mixed. About 3 grams of the mixture were placed in a clay crucible and ignited with a piece of burning magnesium ribbon. Successive portions of the mixed powder were added to the glowing mass in the crucible after each violent reaction had subsided somewhat. The entire procedure required approximately one-half hour. The cooled mass of aluminum selenide was crushed to a coarse powder and stored in a closed jar.

Approximately one-third of the aluminum selenide powder was placed in a simple gas generation apparatus (filter flask fitted with a dropping funnel and gas exit tubing). Water was allowed to drop slowly on the powder from the dropping funnel and the hydrogen selenide liberated thereby was conducted through a glass wool filter to eliminate entrained selenium powder, and then through a well-stirred solution of 7 grams (approximately 0.02 mole) of ruthenium chloride and 50 ml. of conc. hydrochloric acid in 700 ml. of water. The rate of generation of hydrogen selenide was quite rapid, and reasonably well controlled by the rate of water addition. Precipitation of black ruthenium selenide was complete in about 1.5 hours as evidenced by the complete discharge of the magenta color of the original solution and the lack of precipitation accompanying passage of the gas through the supernatent liquid when stirring was stopped. The solid ruthenium selenide was removed by filtration, washed with water and dried. The yield was 6.0 grams.

EXAMPLE B

A solution was prepared by dissolving 2.55 grams (0.01 mole) of rhodium chloride in 20 ml. of a 1:1 mixture of nitric acid and water plus 6 ml. of concentrated hydrochloric acid. To this was added a solution of 0.79 gram (0.01 mole) of selenium dissolved in 8 ml. of aqua regia (3:1 mixture of conc. hydrochloric and nitric acids). The resulting solution of rhodium selenite in strong acids was added slowly to a boiling stirred solution of 15 grams of hydrazine dihydrochloride and 75 ml. of ammonium hydroxide in 150 ml. of water. Boiling and stirring were continued for 1.5 hrs. after which the mixture was cooled and filtered to remove the black solid rhodium selenide, which was washed with water and dried. The yield was 1.8 grams.

EXAMPLE C

In the manner and apparatus described in Example A, a mixture of 30 grams of powdered aluminum metal and 80 grams of tellurium powder was fused by ignition with a small piece of burning magnesium ribbon. The resulting aluminum telluride was ground in a mortar and stored in a closed jar.

Hydrogen telluride gas was generated by dropping water onto the aluminum telluride powder as described in Example A for the generation of hydrogen selenide. The gas was passed into a stirred solution of 7 grams (0.033 mole) of palladium chloride in 600 ml. of approximately 6 N aqueous hydrochloric acid. The precipitation of palladium telluride appeared to be complete after about three hours. The solid was removed by filtration, washed with water and dried. The yield was 3.5 grams.

EXAMPLE D

A solution was prepared by dissolving 1.28 grams (0.01 mole) of tellurium in 6 ml. of conc. hydrochloric acid plus 6 ml. of conc. nitric acid. The resulting tellurous acid was then poured into a stirred solution of 4.9 grams (0.01 mole) of chloroplatinic acid ($H_2PtCl_6 \cdot nH_2O$) in 5 ml. of water, 5 ml. of conc. nitric acid and 3 ml. of conc. hydrochloric acid. This resulting solution of platinum tellurite was added slowly to a rapidly stirred solution of 15 grams (0.015 mole) of hydrazine di-hydrochloride dissolved in 150 ml. of water and 50 ml. of ammonium hydroxide. The mixture was kept at the boiling point during the addition and for one and one-half hours afterward, then was cooled. The black solid platinum telluride was removed by filtration, washed with water and dried. The yield was 2.9 grams.

Table I summarizes the method of preparation of the platinum metal selenides and tellurides used in the various examples to follow. In the columns headed, "Methods" the letter P stands for the method of Precipitation by hydrogen selenide or telluride in the manner described in Examples A and C while R stands for a procedure of chemical Reduction such as described in Examples B and D.

TABLE I.—PREPARATION OF PLATINUM METAL SELENIDES AND TELLURIDES

| | Methods of preparation | |
|---|---|---|
| | Selenide | Telluride |
| Metal: | | |
| Ruthenium | P | P, R |
| Rhodium | P, R | P, R |
| Palladium | P | P, R |
| Osmium | P | P |
| Iridium | P, R | R |
| Platinum | P | P, R |

To illustrate more fully the instant invention attention is directed to the following examples:

EXAMPLE 1

To a 170 ml. stainless steel Magne-Dash autoclave was added 12.3 grams (0.10 mole) of nitrobenzene, 55 ml. of toluene and 0.65 gram (10 g./l.) of bulk rhodium selenide prepared in the manner described in Example B. The autoclave was closed, purged first with nitrogen then with hydrogen, and finally hydrogen was added to a pressure of 700 p.s.i.g. The autoclave was agitated and heated rapidly to 150° C. Hydrogen was admitted as required to maintain a pressure range of 700–900 p.s.i.g. After about 10 min. at 150° C. the absorption of hydrogen ceased abruptly at approximately 100% of theoretical absorption. The autoclave was cooled and depressurized, and the contents removed. The catalyst was separated by filtration. Gas-liquid chromatographic analysis showed the filtrate contained only toluene, water and aniline, indicating complete reduction of the nitro group and no side reactions.

EXAMPLE 2

Example 1 was repeated except that hydrogen was admitted as necessary to maintain a pressure range of 50–150 p.s.i.g. (3.3–10 atm.) The reaction was carried out at 120–125° C. at this pressure range and was complete in about 0.7 hr. as evidenced by the abrupt cessation of hydrogen absorption at 100% of theory. Gas-liquid chromatographic analysis of the liquid contents of the autoclave confirmed a 100% conversion of nitrobenzene to aniline, with no other reactions occurring.

EXAMPLE 3

The 170 ml. stainless steel autoclave was charged as in Example 1, using 0.65 gram of bulk palladium selenide prepared in the manner described in Example A. The autoclave was closed, purged, pressurized and heated with agitation as describe in Example 1, to 180° C. and 700–900 p.s.i.g. After approximately 20 min. at 180° C. the absorption of hydrogen ceased abruptly at approximately 100% of theoretical absorption. The autoclave and contents were treated as in Example 1, and gas-liquid chromatographic analysis of the filtrate again showed only toluene, water and aniline, indicating complete reduction of the nitro group.

EXAMPLE 4

In the manner and apparatus described in Example 1, nitrobenzene was reduced with hydrogen over 0.65 gram of osmium telluride prepared in the manner described in Example C. The reduction was carried out at 180° C., at 700–900 p.s.i.g. and was complete in approximately one-half hour. Gas-liquid chromatographic analysis was made of the contents worked up as described in Example 1. Only aniline, toluene and water were found.

EXAMPLE 5

In the equipment and manner described in Example 1, nitrobenzene was reduced with hydrogen in the presence of 0.65 gram of platinum telluride prepare as described in Example D. After approximately three-quarters of an hour at 80° C., the reduction was complete. Gas-liquid chromatographic analysis of the autoclave contents revealed only aniline, toluene, and water.

Similar complete reductions of aniline without side reactions were obtained using other platinum metal selenides and tellurides, although some exhibited a lower order of activity.

EXAMPLE 6

To the 170 ml. stainless steel Magne-Dash was added 18.6 grams (0.20 mole) of aniline, 37.1 grams (47 ml., 0.64 mole) of acetone and 0.65 gram of ruthenium selenide prepared in Example A. The autoclave was closed, purged first with nitrogen, then with hydrogen. Hydrogen was added to a pressure of 700 p.s.i.g. The autoclave was heated to 180° C. and held at this temperature while the pressure was maintained at 700–900 p.s.i.g. by the addition of fresh hydrogen. When the absorption of hydrogen had essentially ceased after 1 hour, the autoclave was cooled and depressurized. The contents were removed and the catalyst separated by filtration. Gas-liquid chromatographic analysis of the filtrate showed essentially 100% conversion of aniline to N-isopropylaniline.

EXAMPLE 7

A 600 ml. stainless steel Magne-Dash autoclave was charged with 69.8 grams (0.75 mole) of aniline 130 grams (2.25 moles) acetone, 2.5 grams of 5% rhodium-on-carbon, and 0.79 gram (0.01 mole) of selenium. The autoclave was closed, purged first with nitrogen, then with hydrogen. Hydrogen was then added to a pressure of 1300 p.s.i.g. The autoclave was heated to 180° C. and held at this temperature. Hydrogen was admitted as needed to maintain the pressure at 1200–1400 p.s.i.g. When absorption of hydrogen has essentially ceased after 1½ hours the autoclave was cooled, depressurized, and opened. The contents were removed and filtered to separate the catalyst. Gas-liquid chromatographic analysis of the filtrate showed a quantitative conversion of aniline to N-isopropylaniline.

EXAMPLE 8

The 170-ml. Magne-Dash was charged as in Example 6, using 0.65 gram of palladium telluride prepared in Example C. The autoclave was closed, purged, pressurized and heated to 180° C. as in Example 6. After about five hours at 180° C., and 700–900 p.s.i.g. the autoclave was cooled, depressurized and the contents removed. The catalyst was removed by filtration. Gas-liquid chromatographic analysis of the filtrate showed 97% N-isopropylaniline and 3% aniline in addition to the excess acetone and water.

EXAMPLE 9

A solution was prepared from 3.71 grams of iridium chloride in 50 ml. of concentrated ammonium hydroxide rather than in strong acid in which iridium chloride is insoluble. This solution was mixed with tellurous acid and carried through the reduction procedure as described in Example D.

The 170-ml. stainless steel Magne-Dash was charged with aniline and acetone as described in Example 6 and with 0.65 gram of iridium telluride prepared as described above. The autoclave was closed and purged with nitrogen and hydrogen. Hydrogen was admitted to a pressure of 700 p.s.i.g. and the autoclave was heated to about 60 to 80° C. Within this temperature range and at a pressure range of 700–900 p.s.i.g. the absorption of hydrogen was reasonably rapid. After 1.2 hrs. with the absorption still proceeding slowly the autoclave was cooled, depressurized and emptied. The catalyst was removed by filtration. Gas-liquid chromatographic analysis of the filtrate showed only water, acetone, N-isopropylaniline, and aniline amounting to approximately 12% of the initial charge indicating that the reductive alkylation was proceeding well.

The reductive alkylation of aniline with acetone was carried out using other platinum metal selenides and tellurides as catalysts with equal results although some of the catalysts exhibited a lower order of activity than shown in the examples above.

EXAMPLE 10

The 170-ml. stainless steel Magne-Dash was charged with 18.4 grams (0.10 mole) of N-phenyl-p-phenylenediamine, 46 ml. (0.62 mole) of acetone, and 0.27 gram (4.1 g./l.) of rhodium selenide as prepared in Example B. The autoclave was closed, purged with nitrogen and hydrogen. Hydrogen was admitted to 700 p.s.i.g., and the autoclave was agitated and heated to 150° C., while the pressure was maintained between 700 and 870 p.i.s.g. by the admission of fresh hydrogen as required. After about 0.5 hr. at these conditions the absorption of hydrogen practically ceased. After an additional 0.5 hr. at 150° C. the autoclave was cooled, depressurized and emptied. The catalyst was removed by filtration using additional acetone to maintain complete solution of the crystalline reaction product. The filtrate was heated to 160° C. at 50 mm. pressure to remove the volatile materials by topping (stripping of volatiles without rectification). Gas-liquid chromatographic analysis of the distillate showed only acetone and water. The residue product weighing 22 grams was allowed to solidify. It melted at 73–78° C. Gas-liquid chromatographic analysis indicated better than 99% purity as N-isopropyl-N′-phenyl-p-phenylenediamine. Thus there was obtained a better than 97% yield of desired product.

EXAMPLE 11

The 170-ml. stainless steel Magne-Dash was charged with 15.8 grams (0.10 mole) of p-nitrochlorobenzene) 55 ml. (0.75 mole) of acetone and 0.65 gram (10 g./l.) of palladium selenide prepared by the method described in Example A. The autoclave was closed, purged with nitrogen and hydrogen, and hydrogen was added to 700 p.s.i.g. The autoclave was agitated and heated to 180° C. and held at this temperature and at 700–900 p.s.i.g. for 1¾ hrs. The autoclave was cooled, depressurized and emptied. The catalyst was removed from the autoclave contents by filtration and the filtrate analyzed by gas-liquid chromatographic analysis. It was found to consist of N-isopropyl-p-chloroaniline and p-chloroaniline representing approximately 80 and 20 mole percent respectively of the starting material, and only a trace (less than 1%) of N-isopropylaniline in addition to excess acetone, indicating an almost complete lack of dechlorination. No aniline or isopropanol were detected.

EXAMPLE 12

The 170-ml. stainless steel Magne-Dash was charged with 13.8 grams (0.10 mole) of p-nitroaniline, 55 ml. (0.61 mole) of methyl ethyl ketone and 0.65 gram (10 g./l.) of platinum telluride prepared as described in Example D. The autoclave was closed, purged with nitrogen and hydrogen. Hydrogen was added to a pressure of 700 p.s.i.g. The autoclave was agitated and heated to 180° C., while pressure was maintained at 700–900 p.s.i.g. by admission of fresh hydrogen. After approximately 1¼ hrs. the reaction had practically ceased. The temperature and pressure were maintained for an additional 1¼ hrs. when the autoclave was cooled and depressurized. The contents were removed and filtered to eliminate the catalyst. Gas-liquid chromatographic analysis of the filtrate showed only methyl ethyl ketone, water and N,N'-di-sec-butyl-p-phenylene-diamine, indicating 100% conversion of starting material to desired product.

EXAMPLE 13

The 179-ml. stainless steel Magne-Dash was charged with 21.8 grams (0.10 mole) of phenyl disulfide, 45 ml. of isopropanol and 0.59 gram (9.1 g./l.) of rhodium telluride prepared in the manner described in Example D. The autoclave was closed and purged with nitrogen and hydrogen. Hydrogen was added to 700 p.s.i.g. and the autoclave was agitated and heated to 110° C. Hydrogen was admitted as required to maintain a pressure range of 700–900 p.s.i.g. After approximately 0.2 hr. the absorption of hydrogen ceased abruptly. The autoclave was cooled and the contents removed and filtered. Gas-liquid chromatographic analysis of the filtrate indicated only isopropanol and thiophenol were present. Thus, there had been 100% conversion of the starting material to the desired product.

EXAMPLE 14

The 170-ml. Magne-Dash was charged as in Example 13 except with 0.65 gram (10 g./l.) of palladium selenide prepared in the manner described in Example A. The autoclave was purged, pressured and agitated as in Example 13, and heated to 180° C. After approximately 5½ hrs. at this temperature and 700–900 p.s.i.g. pressure the absorption of hydrogen ceased. The autoclave was cooled and the product isolated as in Example 13. Gas-liquid chromatographic analysis of the filtrate indicated only isopropanol and thiophenol were present.

Ruthenium, rhodium, palladium, osinium, iridium and platinum selenides and tellurides are the preferred catalysts.

Having thus described my invention, what I claim and desire to protect by Letters Patent is:

1. A reductive alkylation process which comprises reacting an alkyl, cycloalkyl or aryl organic compound containing at least one functional group which is an amino group with hydrogen and with a ketone having 3 to 15 carbon atoms to form the corresponding alkylated amine in the presence of a catalytic amount of a platinum metal selenide or a platinum metal telluride.

2. The process of claim 1 wherein the organic compound is aniline and the ketone is acetone.

3. The process of claim 1 wherein the organic compound is N-phenyl-p-phenylenediamine and the ketone is acetone.

4. The process of claim 1 wherein the organic compound is p-nitroaniline and the ketone is methyl ethyl ketone.

References Cited

UNITED STATES PATENTS

| | | | |
|---|---|---|---|
| 1,991,096 | 2/1935 | Jackson | 252—439 X |
| 2,161,066 | 6/1939 | LaLande | 252—439 X |
| 2,380,420 | 7/1945 | Emerson | 260—577 |
| 2,823,101 | 2/1958 | Jockers et al. | 252—439 X |

OTHER REFERENCES

Groggins: Unit Process in Organic Chemistry, McGraw-Hill Book Company, Inc., New York, 1958, p. 175.

CHARLES B. PARKER, Primary Examiner

C. F. WARREN, Assistant Examiner

U.S. Cl. X.R.

252—439; 260—577, 689, 690